United States Patent
Agarwal et al.

(10) Patent No.: US 12,405,906 B2
(45) Date of Patent: Sep. 2, 2025

(54) COMBINING READ REQUESTS HAVING SPATIAL LOCALITY

(71) Applicant: Micron Technology, Inc., Boise, ID (US)

(72) Inventors: Nikesh Agarwal, Boise, ID (US); Robert M. Walker, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/598,722

(22) Filed: Mar. 7, 2024

(65) Prior Publication Data

US 2024/0320167 A1    Sep. 26, 2024

Related U.S. Application Data

(60) Provisional application No. 63/491,470, filed on Mar. 21, 2023.

(51) Int. Cl.
   *G06F 13/16*     (2006.01)
   *G06F 13/28*     (2006.01)

(52) U.S. Cl.
   CPC ...... *G06F 13/1668* (2013.01); *G06F 13/1673* (2013.01); *G06F 13/28* (2013.01)

(58) Field of Classification Search
   None
   See application file for complete search history.

(56) References Cited

U.S. PATENT DOCUMENTS

| | | | |
|---|---|---|---|
| 9,135,123 B1 * | 9/2015 | Armangau | G06F 16/172 |
| 11,064,021 B2 * | 7/2021 | Chen | H04L 67/1014 |
| 2004/0143720 A1 * | 7/2004 | Mansell | G06F 12/1063 |
| | | | 711/163 |
| 2006/0092776 A1 * | 5/2006 | Kuch | G11B 27/034 |
| 2021/0089236 A1 * | 3/2021 | Yang | G06F 3/0622 |

* cited by examiner

*Primary Examiner* — Michael Sun

(57) ABSTRACT

Provided is a system comprising a communication interface between a host and a device, wherein the header of a first memory request transmitted on the forward link of the communication interface encodes, in a bit vector, addresses to be read for a plurality of second memory requests. Combining one or more read requests with another request such that a single request header is transmitted for a plurality of respective requests provides for more efficient use of the forward link bandwidth. Corresponding methods are also described.

20 Claims, 10 Drawing Sheets

FIG. 3B

Downstream Flit (306):

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| RwD | Data | Data | Data | Data | RwD | Data | Data | Data | Data | Req | Req | | | | CRC |

H14 — G14

Upstream Flit:

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| 2DRS | Data | Data | Data | Data | Data | Data | Data | Data | 2NDR | | | | | | CRC |

H15 — G7

Table (308):

| RwD | Req | WR Data | P-Slot | D-Slot | E-Slot | Valid | Data | Utilization | Data Eff. | CXL Total | CXL Payload |
|---|---|---|---|---|---|---|---|---|---|---|---|
| 13 | 13 | 16 | 4 | 6 | 3 | 180 | 128 | Write % | 50% | 44.6 GB/s | 31.7 GB/s |
| 2 | 2 | 8 | 2 | | | | | 75% | 53% | 61.3 GB/s | 63.5 GB/s |

Total Bandwidth

| 1 NDR | 2DRS/2NDR | 3 NDR | RD Data | P-Slot | D-Slot | E-Slot | Valid | Data | Utilization | Data Eff. | CXL Total | CXL Payload |
|---|---|---|---|---|---|---|---|---|---|---|---|---|
| 5 | 10 | 15 | 16 | 2 | 6 | 5 | 148 | 128 | Read % | 50% | 36.7 GB/s | 31.7 GB/s |
| 0 | 2 | 0 | 8 | | | | | 62% | 53% | 36.7 GB/s | |

FIG. 3C

COMBINING READ REQUESTS HAVING SPATIAL LOCALITY

CROSS-REFERENCE TO RELATED APPLICATION

This application claims benefit to U.S. Provisional Patent Application No. 63/491,470, filed Mar. 21, 2023, the disclosure is incorporated herein by reference in its entirety.

FIELD OF TECHNOLOGY

The present disclosure relates to improving bandwidth utilization in communication links by leveraging spatial locality of read requests.

BACKGROUND

Interconnection networks and links desirably have as little latency as possible. That is, it is desired that the time taken to transfer a message from one node to another is kept minimal, while also enabling concurrent transactions. Multiple messages can flow through the interconnect network and/or links at any time. Each message to be transferred can be broken into smaller chunks of data structures called packets. In the examples described in this disclosure, each packet may in turn be broken into message flow control units or flits. A flow control mechanism may decide which message gets to flow and which message is held back.

A flit is a link-level data structure that forms a network packet or stream. For an example of how flits work in a network, an example of how packets are transmitted in terms of flits can be considered. A packet transmitting between A and B, for a request that may require more than one flit, may happen in the following steps: The packet will be split into flits C and D; the transmit buffer in A will load the first flit C and send it to B; after B receives C, A moves C out of the transmit buffer; the transmit buffer in A then loads the next flit D and sends it to B; and at that point both flits that make up the request have been sent to B. B then combines the two flits to generate the packet. Some request or response packets do not require being split into multiple flits. One or more such request or response messages can be packed into a single flit.

The communication via flits between a host, for example, a central processing unit (CPU) and another device (e.g., a memory device) may be carried out in accordance with a standard protocol. Compute Express Link™ (CXL) is a dynamic multi-protocol technology designed to support accelerators and memory devices. In the CXL protocol, a CXL link layer (the link layer) is responsible for reliable transmission of transaction layer packets (TLP) across a Flex Bus link. CXL provides a rich set of protocols that include input output (I/O) semantics similar to peripheral component interconnect express (PCIe), or CXL.io, caching protocol semantics (i.e., CXL.cache), and memory access semantics (i.e., CXL.mem) over a discrete or on-package link. CXL.io is required for discovery and enumeration, error report, and host physical address (HPA) lookup. CXL.mem and CXL.cache protocols may be optionally implemented by the particular accelerator or memory device usage model.

According to the CXL protocol, a flit can be accepted or rejected at a receiver side based on the flow control protocol and the size of a receive buffer. The mechanism of link-level flow control allows the receiver to send a continuous signal stream to the transmitter to control whether it should continue sending flits. When a packet is transmitted over a link, the packet will often need to be split into multiple flits before the transmitting begins.

By way of example, for CXL.cache and CXL.mem, layouts, a 528-bit flit layout may be specified for CXL2.0 on PCIE Gen 5 and a 256-byte flit layout is specified for CXL 3.0 on PCIE Gen 6. The CXL 2.0 flit layout comprises 4 16-byte slots, and the CXL 3.0 flit layout comprises 16 16-byte slots. CXL 3.0 also provides a 64-byte flit layout. Flit packing rules for selecting transactions from internal queues to fill the available slots (e.g., 4 slots per flit in one example CXL implementation) in the flit are also specified. Other features described for CXL.cache and CXL.mem include a retry mechanism, link layer control flits, a CRC calculation, and viral/poison. A key benefit of CXL is that it provides low-latency, high-bandwidth paths for an accelerator to access the system and for the system to access memory attached to a CXL device.

Flex Bus provides a point-to-point interconnect that can transmit native PCIe protocol or dynamic multi-protocol CXL to provide I/O, caching, and memory protocols over PCIe electricals. The primary link attributes include support of the following features: native PCIe mode, full feature support as defined in the PCIe specification; CXL mode, as defined in the CXL specification; Configuration of PCIe vs CXL protocol mode; Signaling rate of 32 GT/s, in PCIE Gen 5 per lane (x8=32 GT/s*8/8=32 GBps per direction, x16=32 GT/s*16/8=64 GBps) or signaling rate of 64 GT/s in PCI Gen 6 per lane (x8=64 GT/s *8/8=64 GBps per direction, x16=64 GT/s*16/8=128 GBps), degraded rate of 16 GT/s or 8 GT/s in CXL mode; Link width support for x16, x8, x4, x2 (degraded mode), and x1 (degraded mode).

The CXL Specification defines some flit packing rules. It is assumed that a given queue has credits towards the receiver and any protocol dependencies (SNP-GO ordering, for example) have already been considered. Rollover is defined as any time a data transfer needs more than one flit. Example flit packing rules may include that a data chunk containing 128 b (format G0), can only be scheduled in Slots 1, 2, and 3 of a protocol flit since Slot 0 has only 96 b available, as 32 b are taken up by the flit header. Note that in CXL 2.0 all slots of the flit may carry data (e.g., referred to as a data flit). In CXL 3.0 however, one slot is reserved for header (and one more is used for CRC), and thus CXL 3.0 cannot have all data flits.

The following rules generally apply to rollover data chunks: If there's a rollover of more than 3 16 B data chunks, the next flit must necessarily be an all data flit; If there's a rollover of 3 16 B data chunks, Slot 1, Slot 2 and Slot 3 must necessarily contain the 3 rollover data chunks, and Slot 0 will be packed independently (it is allowed for Slot 0 to have the Data Header for the next data transfer); If there's a rollover of 2 16 B data chunks, Slots 1 and Slot 2 must necessarily contain the 2 rollover data chunks. Slot 0 and Slot 3 will be packed independently; If there's a rollover of 1 16 B data chunk, Slot 1 must necessarily contain the rollover data chunk. Slot 0, Slot 2 and Slot 3 will be packed independently; If there's no rollover, each of the 4 slots will be packed independently.

Memory media devices are widely used to store information in various electronic devices such as computers, user devices, wireless communication devices, cameras, digital displays, and the like. Information is stored by programming memory cells within a memory device to various states.

For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. DRAM is organized as an array of storage cells with each cell storing a programmed value. SRAM memory may maintain their programmed states for the duration of the system being powered on. Non-volatile memory cells (e.g., NAND memory cells) may maintain their programmed states for extended periods of time even in the absence of an external power source.

Memory media devices may be coupled to a host to store data, commands, and/or instructions for use by the host while the computer or other electronic system is operating. For example, data, commands, and/or instructions can be transferred between the host and the memory device(s) during operation of a computing or other electronic system. A controller, referred to as a memory controller, may be used to manage the transfer of data, commands, and/or instructions between the host and the memory devices.

Improvements are needed in bandwidth utilization of interfaces managed by the memory controller. In particular, improvements are needed for bandwidth utilization in CXL-related bidirectional interfaces, such as an interface between a host device and a target.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 3B shows an example flit packing without the combining of read requests and the effective link efficiency.

FIG. 3C shows an example flit packing with the combining of read requests according to some embodiments of the present disclosure.

DETAILED DESCRIPTION

In the embodiments, the combining of spatially-local read requests for efficient flit packaging described herein may be applied to an interface (e.g., communication link) between a host, such as a computer, and an attached target such as a memory device. The memory device may include one or more memory controllers that can orchestrate performance of operations to write data to, or read data from, at least one of multiple types of memory devices. In some embodiments, the host and target each comprises a CXL controller that is responsible for communication over a bidirectional link that connects the host and the target.

Figure 1:
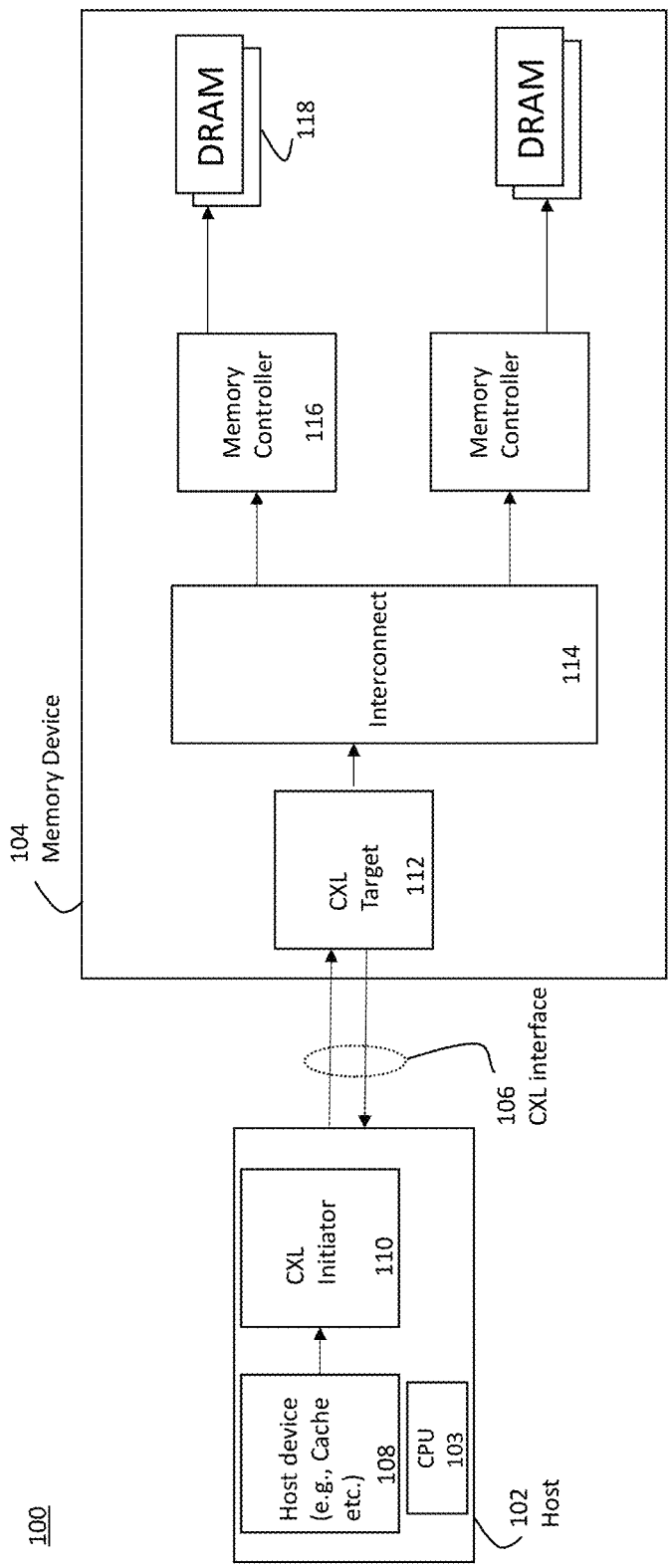
FIG. 1 illustrates an example functional block diagram of a computing system including an interface host device, an interface target device, and a communication interface connecting the host and target devices that are configured to improve bandwidth utilization in accordance with some example embodiments of the present disclosure.

FIG. 1 illustrates an example functional block diagram of a computing system 100 including a host 102 that includes a host device 108 (e.g., a cache memory) and a CXL initiator 110. The computing system 100 also includes a memory device 104 including a CXL target 112, interconnect 114, memory controllers 116, and memory media modules 118. A communication interface 106 facilitates communication between the CXL initiator 110 and the CXL target 112, which are configured to improve bandwidth utilization in accordance with the embodiments. The communication interface 106 is a CXL interface that is configured to connect the CXL initiator 110 (also referred to as CXL host or CXLmaster) and the CXL target 112 (also referred to as CXL slave) in accordance with, for example, CXL 2.0 and/or CXL 3.0 protocol specifications. The embodiments, however, are not limited to the mentioned versions of CXL, or to the CXL protocol.

The communication interface 106 comprises two unidirectional links, one unidirectional link on which the host 102 transmits messages to the memory device 104 and another unidirectional link on which the memory device 104 transmits messages to the host 102. The host 102 may be a computer or the like with one or more processors, such as a CPU, graphics processing unit (GPU), application specific integrated circuit system (ASIC), field programmable gate array (FPGA), or another type of processor.

The host 102 may be configured to access a device, such as, for example, the memory device 104. By way of example, the memory media modules 118 may include one or more DRAM modules. The memory device 104 may be configured as the main memory, or some other memory, of the host 102. Example embodiments are not limited to DRAM, and may, for example, include memory devices 104 that have one or more modules of one, or a combination, of memory types such as DRAM and/or SRAM.

According to some embodiments, the communication interface 106 is configured to operate in accordance with the CXL standard. When operating as a CXL interface based on PCIe 5.0/6.0, the communication interface 106 comprises a pair of unidirectional links—each contributing to system bandwidth. CXL2.0 provides an interface which leverages PCIe 5.0 (32 GT/s), and CXL 3.0 leverages PCIe 6.0 (64 GT/s) in each direction.

According to some embodiments in which the communication interface 106 operates in accordance with CXL, the memory device 104 is a CXL Type 3 device. That is, the interface operates in a host-target (also referred to as master-slave) mode in which the CXL initiator controller 110 in host 102 operates as host and the CXL target controller 112 in the memory device 104 operates as target. In other words, in these embodiments where the memory device is a CXL Type 3 device, all requests (e.g., read requests and write requests) are initiated by the host 102 and the memory device 104 responds to such requests. Example embodiments, however, are not limited to host-target configurations.

Multiple requests and data are transported over the communication interface 106 flits, which, in some embodiments, are fixed width flits. The host device (e.g., CXL Initiator) is responsible for generating requests to the memory device (e.g., CXL device). The memory device has a CXL controller to unpackage the flit requests incoming from the host and forwards the requests to the backend memory media (e.g., DRAM). Each flit in CXL 2.0 is of 528 bits (4 slots each of 16 B+2 bytes for CRC=66 B or 528 bits). Each flit in CXL 3.0 is of 256 B (16 slots each of 16 B where 238 B in each flit is for TLP Payload and 18 B is for CRC and FEC). In some embodiments, in CXL 3.0, 15 out of the 16 slots can be used for multiple requests and data.

In example embodiments, the CXL initiator 110 and the CXL target 112 are configured to implement the functionality required by CXL. For example, the CXL initiator 110 and the CXL target 112 operate to package messages or TLP into flits for transmission over communication interface 106, and to unpack flits received over the communication interface 106 to obtain the transmitted messages.

As noted above, in some embodiments, the memory device 104 is a CXL compliant memory system (e.g., the memory system can include a PCIe/CXL interface). CXL is a high-speed CPU-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When memory device 104 is CXL compliant, the interface management circuitry in the CXL target 112 (including data link and transaction control) may use CXL protocols to manage the communication interface 106 which may comprise PCIe PHY interfaces.

In some embodiments, the main memory for computer system 100 is stored in DRAM cells that have high storage density. DRAM cells lose their state over time. That is, the DRAM cells must be refreshed periodically, hence the name Dynamic. DRAM can be described as being organized according to a hierarchy of storage organization comprising a dual in-line memory module (DIMM), rank, bank, and array. A DIMM comprises a plurality of DRAM chips, and the plurality of chips in a DIMM are organized into one or more "ranks." Each chip is formed of a plurality of "banks." A bank is formed of one or more "rows" of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

Multiple DRAM chips are used for every access to improve data transfer bandwidth. Multiple banks are provided so that the computing system can be simultaneously working on different requests. To maximize density, arrays within a bank are made large, rows are wide, and row buffers are wide (8 KB read for a 64 B request). Each array provides a single bit to the output pin in a cycle (for high density and because there are few pins). DRAM chips are often described as xN, where N refers to the number of output pins; one rank may be composed of eight x8 DRAM chips (e.g., the data bus is 64 bits). Banks and ranks offer memory parallelism, and the memory device 104 may schedule memory accesses to maximize row buffer hit rates and bank/rank parallelism.

In some embodiments, the memory media modules 118 is low power double data rate (LPDDR) LP5 or other similar memory interfaces. However, embodiments are not limited thereto, and memory media modules 118 may comprise one or more memory media of any memory media types, such as, but not limited to, types of DRAM.

Each of the memory controllers 116 can receive the same command (e.g., command to read or write memory media modules 118) and address and drive a corresponding plurality of channels connecting to the memory media modules 118 substantially simultaneously. By using the same command and address for the plurality of media controllers, each of the plurality of memory controllers 116 can utilize the plurality of channels to perform the same memory operation on the same plurality memory cells. Each memory media modules 118 may correspond to a RAID component. As used herein, the term substantially intends that the characteristic need not be absolute but is close enough so as to achieve the advantages of the characteristic.

For example, substantially simultaneously is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, multiple memory controllers can be utilized such that they are writing data to the memory devices at the same time, regardless of whether one of the media controllers commences or terminates prior to the other.

A front-end portion of memory device 104 includes the CXL target 112 and the interconnect 114 (e.g., CXL interconnect) to couple the one or more memory controllers 116 to the host 102 through one or more I/O lanes of the interface 106. The communications over I/O lanes may be according to a protocol such as, for example, PCIe. In some embodiments, the plurality of I/O lanes can be configured as a single port. Example embodiments may not be limited by the number of I/O lanes, whether the I/O lanes belong to a single port, or the communication protocol for communicating with the host.

Communication interface 106 receives data and/or commands from host device controller 110 through one or more I/O lanes. In an embodiment, communication interface 106 is a physical (PHY) interface configured for PCIe communications. The host CXL controller 110 and the memory device CXL target 112 include interface management circuitry (including data link and transaction control) which provides higher layer protocol support for communications with each other through the type of PHY interface in the communication interface 106.

Memory device 104 includes memory controllers 116 and other circuitry to control, in response to receiving a request or command from host 102, performance of a memory operation. The memory operation can be a memory operation to read data from, or write data to, memory media modules 118.

Memory device 104 may also comprise a security component configured to encrypt the data before storing, and to decrypt data after reading the data in memory media modules 118. In some embodiments, memory device 104 may also include a cache memory to store data associated with the performance of the memory operations.

In some embodiments, in response to receiving a request from the host 102, data read from or written to memory media modules 118 can be stored in cache lines of a cache memory on the memory device 102. The data in the cache memory can be written to memory media modules 118. In some embodiments, an error correction component on the memory device is configured to provide error correction to data read from and/or written to the memory media modules 118. In some embodiments, the data can be encrypted using an encryption protocol such as, for example, Advanced Encryption Standard (AES) encryption, before the data is stored in the cache memory.

A management unit located in the memory device 104 may be configured to control operations of the memory device 104. The management unit may recognize commands from the host 102 and accordingly manage the one or more memory media modules 118. In some embodiments, the management unit includes an I/O bus to manage out-of-band data, a management unit controller to execute a firmware whose functionalities include, but not limited to, monitoring and configuring the characteristics of the memory device 104, and a management unit memory to store data associated with memory device 104 functionalities. The management unit controller may also execute instructions associated with initializing and configuring the characteristics of the memory device 104.

A backend portion of the memory device 104 is configured to couple to one or more types of memory media (e.g., DRAM media 118) via (e.g., through) a plurality of channels, which can be used to read/write data to/from the memory media modules 118, to transmit commands to the memory media modules 118, to receive status and statistics from the memory media modules 118, etc. The management unit can couple, by initializing and/or configuring the memory device 104 and/or the memory media modules 118 accordingly, the memory device 104 to external circuitry or an external device, such as host 102 that can generate requests to read or write data to and/or from the memory media. The management unit is configured to recognize received commands from the host 102 and to execute instructions to apply a particular operation code associated with received host commands for each of a plurality of channels coupled to the memory media modules 118.

The backend portion includes a media controller portion comprising one or more memory controllers 116 and a PHY layer portion comprising a plurality of PHY interfaces connecting the media controllers to the memory media. In some embodiments, the backend portion is configured to couple the PHY interfaces to a plurality of memory ranks of the memory media modules 118. Memory ranks can be connected to the memory controller(s) 116 via a plurality of channels. A respective media controller 116 and a corresponding PHY interface may drive a channel to a memory rank. In some embodiments, each media controller 116 can execute commands independent of the other memory controllers 116. Therefore, data can be transferred from one PHY interface through a channel to memory media modules 118 independent of other PHY interfaces and channels.

Each PHY interface may operate in accordance with the PHY layer that couples the memory device 104 to one or more memory ranks in the memory media modules 118. As used herein, the term "PHY layer" generally refers to the physical layer in the Open Systems Interconnection (OSI) model of a computing system. The PHY layer may be the first (e.g., lowest) layer of the OSI model and can be used to transfer data over a physical data transmission medium. In some embodiments, the physical data transmission medium can be a plurality of channels.

As used herein, the term memory ranks generally refers to a plurality of memory chips (e.g., DRAM memory chips) that can be accessed simultaneously. In some embodiments, a memory rank can be sixty-four (64) bits-wide and each memory rank can have eight (8) pages. In some embodiments, a page size of a first type of memory media device can be larger than a page size of the second type of memory media device. Example embodiments, however, are not limited to particular widths of memory ranks or page sizes.

Each media controller may include a channel control circuitry and a plurality of bank control circuitry where a respective one of the plurality of bank control circuitry is configured to access a respective bank of the plurality of banks on the memory media module 118 accessed by the respective memory controller 116.

Rank, channel, and bank can be considered hardware-dependent logical groupings of storage locations in the media device. The mapping of rank, channel and bank logical groupings to physical storage locations or rows in the memory media device may be preconfigured, or may be configurable, in some embodiments by the memory controller in communication with the memory media modules 118.

In streaming reads or writes traffic over a communications link such as, for example, a CXL interface 106, if the disclosed embodiments are not being used, a sequence of read requests being transmitted may result in the CXL link bandwidth in the forward direction (host to target direction) having low data payload efficiency. In some examples, each flit consumes 1 slot per read or write request and 4 slots per read or write data (read data is sent on the downlink and write data is sent on the uplink). Since each slot can carry only 1 read or write request, conventional CXL implementations consume 16 B per read or write request. In each flit for a x8 PCIe link, this translates to 4 GBps in a flit of 256 B in CXL 3.0 (16 B/256 B*64 GBps=4 GBps or 16/256*100%=6.25%) or 7.5 GBps in a flit of 68 B in CXL 2.0 (16 B/68 B*32 GBps=7.5 GBps or 16/68*100%=23.5%).

For example, 7 read requests can, given the CXL packing rules that disallows more than two consecutive slots in the flit being packed with read request, fully occupy the entire flit without any sufficient remaining space for data payload of a write request. Thus, when the flit is substantially filled with read requests, the CXL forward link may have low data payload efficiency. This reduces the data payload efficiency which could otherwise be used for payload bandwidth and sending less flits over the CXL link. This can help save power too.

Example embodiments provide for improving the bandwidth utilization on communication interface 106 by reducing the number of flit slots occupied by read requests that have spatial locality. In effect, certain sequences of messages being transmitted downstream from the host device to the memory device, if transmitted in the flit in the conventional manner of one read request per slot, can result in some flits having many read requests but little or no data payload. For example, when long sequences of consecutive read requests occur, such as that might result when the host reads a large number of records stored on the memory device, the downstream link may be almost entirely utilized by read requests.

Figure 2:
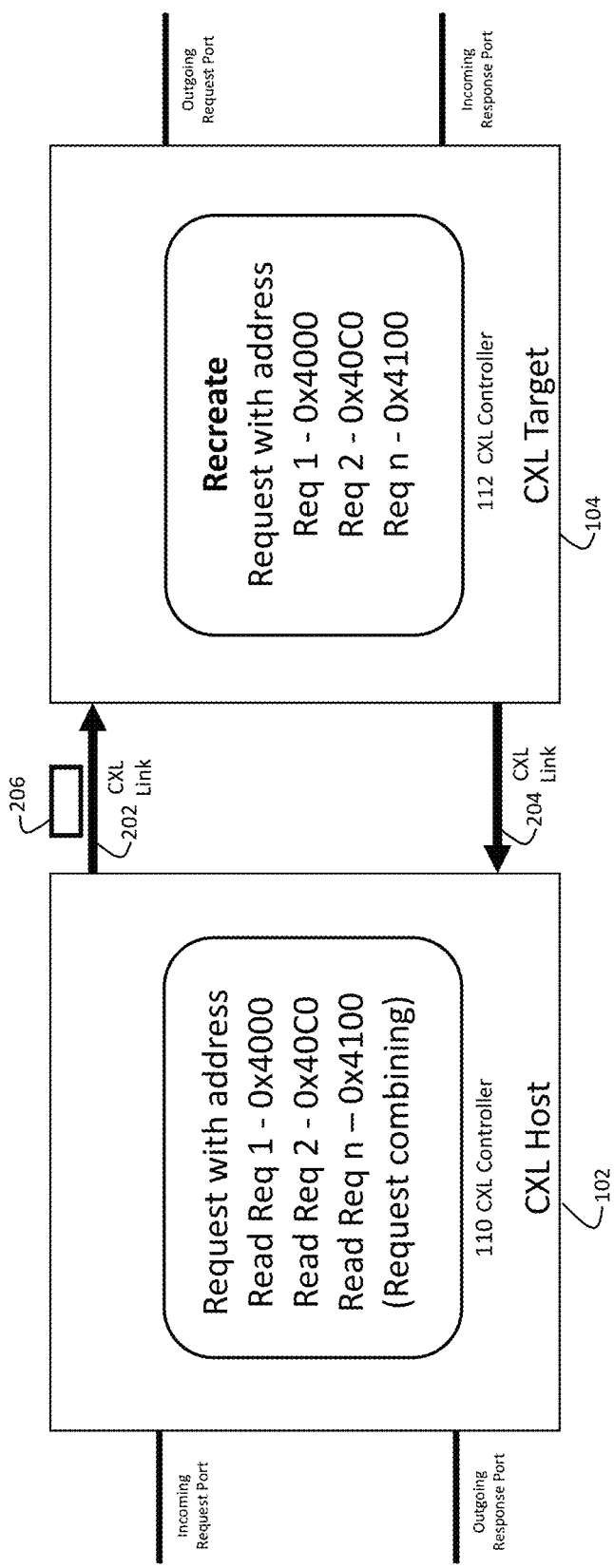
FIG. 2 schematically illustrates an example combining of multiple read requests into a single read request, transmitting the combined single request on a forward link from host to target, and generating the multiple read requests from the single read request, according to some embodiments of the present disclosure.

FIG. 2 schematically illustrates an example of the CXL initiator 110 on the host 102 and the CXL target 112 on the memory device 104 (i.e., target) performing the function of combining read requests at the host CXL initiator 110. Subsequently, at the CXL target 112, the received combined read requests are unpacked in accordance with embodiments of the present disclosure.

FIG. 2 illustrates a first read request (Read Req 1) to access data at memory address 0x4000, a second read request (Read Req 2) to access data at memory address 0x40C0, and another second read request (Read Req 3) to access data at memory address 0x4100 being combined into a single read request, that is packed into one slot of a flit 206 that is transmitted over a downlink CXL link 202 from the host 102 to the memory device 104. In the single combined read request, the base address is set to 0x4000 and respective encoding bits may be set for addresses 0x40C0 and 0x4100 of the second read requests. At the CXL memory device 104, the single read request is received, and based on the encoded bits included in that single read request, the three combined requests are generated. A CXL link 204 in the memory device to host direction is not affected by the combining of read requests for transmission from host to target.

Figure 3A:
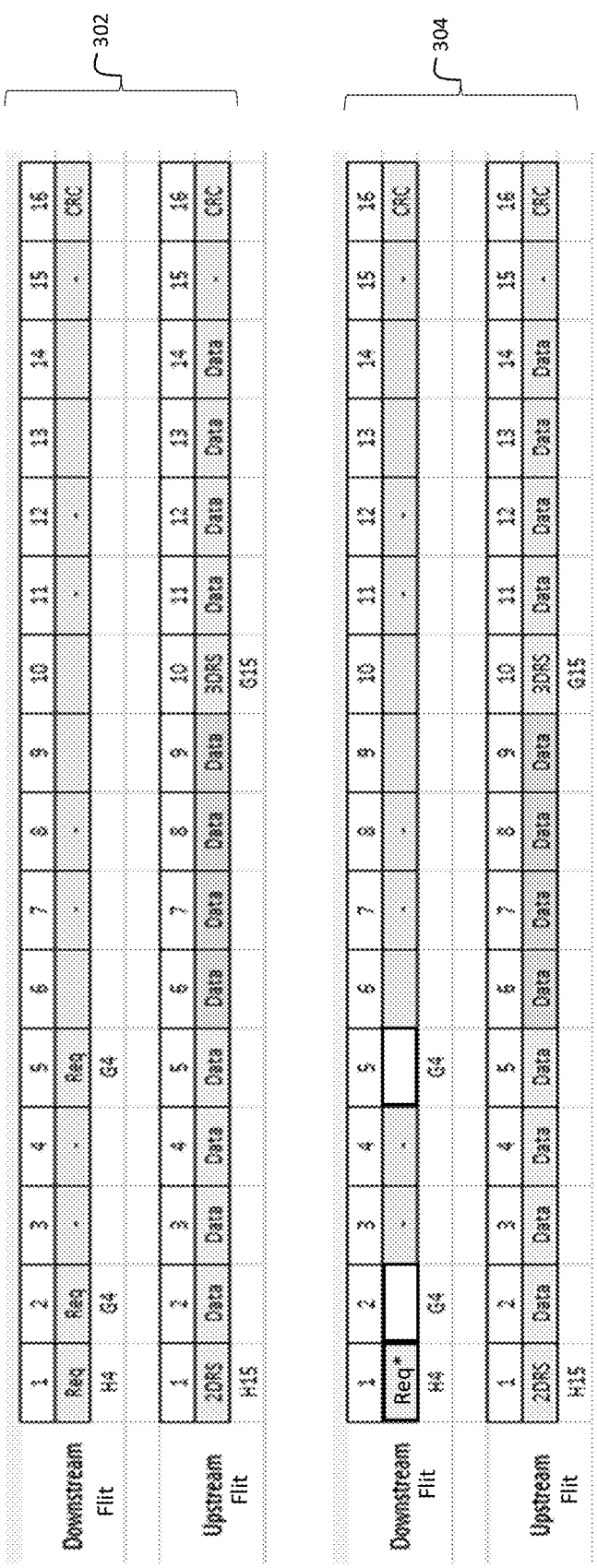
FIG. 3A shows an example flit packing with the combining of read requests in an example embodiment, and also without the combining.

FIG. 3A illustrates an example 302 of transmitting three read requests in accordance with conventional techniques and without using the read request combining techniques described in this disclosure, and an example 304 of the same three requests being combined according to an embodiment. In the figures REQ and RWD represent read request, and write request (i.e., request with data), respectively. As can be seen in example 302, the three read requests consume 5 of the 15 available slots in the downstream flit because of the CXL flit packing rule that no more than two read requests can be packed in consecutive slots.

In example 304, the combined read request "Req*" is shown in slot 1 of the flit. The combined request may have the base address of the request in slot 1 of the flit downlink slot in 302 and may encode bits in a bit vector for the addresses of the read requests in slots 2 and 5 shown in 302. It can also be observed in FIG. 3A that the flit in the uplink direction from the target to the host is packed in the same manner to include the responses to the three read requests, with four slots of data payload included for each read response.

FIG. 3B shows two write requests in table 306 with data followed by two read requests packed in a flit in accordance with a conventional technique and without using the read request combining techniques described in the present disclosure. Only two write requests and two read requests can be fit because there are insufficient slots in the flit to accommodate three write requests. The downstream flit has only 3 of the 15 usable slots remaining.

The upstream flit as shown includes the two read responses together with the data (4 slots for each request) and the two write responses.

Table 308 shows that the conventional slot packing shown in the table 306 results in achieving only an approximately 32 Gbps of CXL payload in approximately 45 Gbps in CXL bandwidth in the conventional packing shown in the table 306.

Figure 3C:
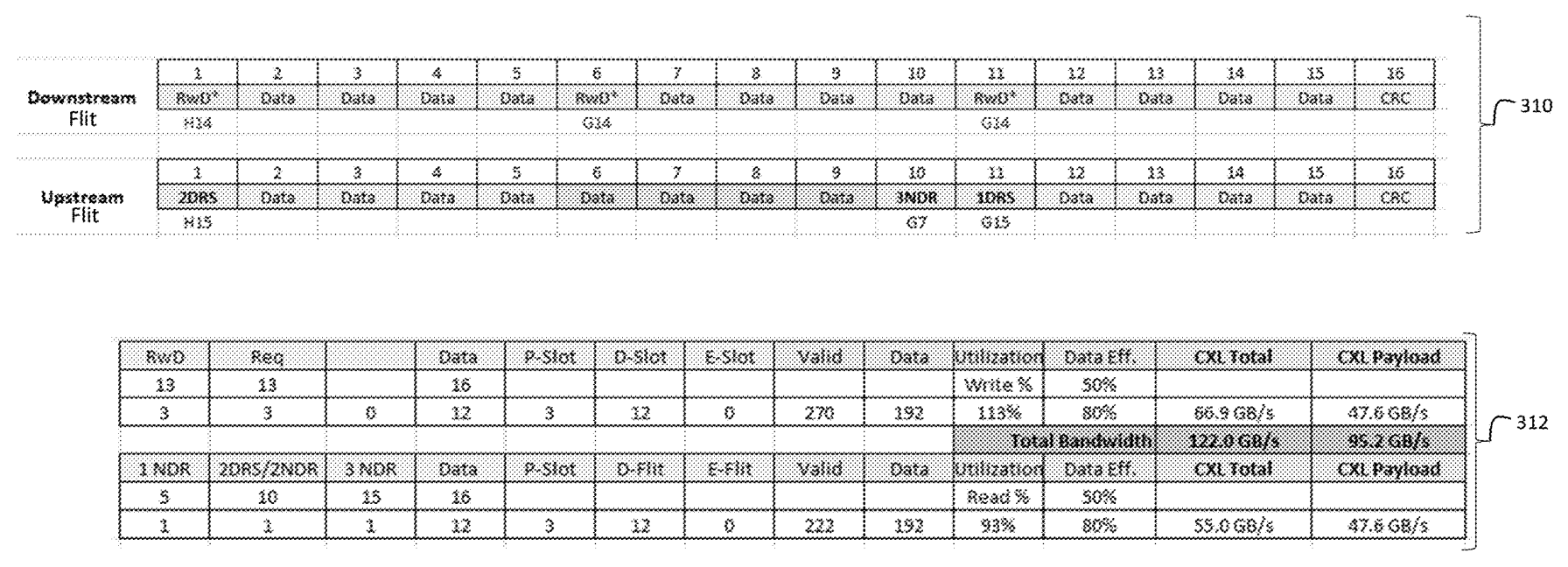

FIG. 3C illustrates in a table 310, a flit packing in accordance with the embodiments. The downstream flit in the table 310 illustrates three write requests each combined with a read request. The corresponding upstream flit contains response headers and data for the responses to the three read requests, and the response headers for the three write data requests. With respect to the downstream flit in the table 310, it is noted that no read request consumes a slot of the flit by itself. Instead, each of three read requests are combined with a corresponding write request. Table 312 shows that the packing, shown in the table 310, achieves an approximately 48 GB/s of CXL payload in approximately 67 GB/s CXL bandwidth.

Figure 4:
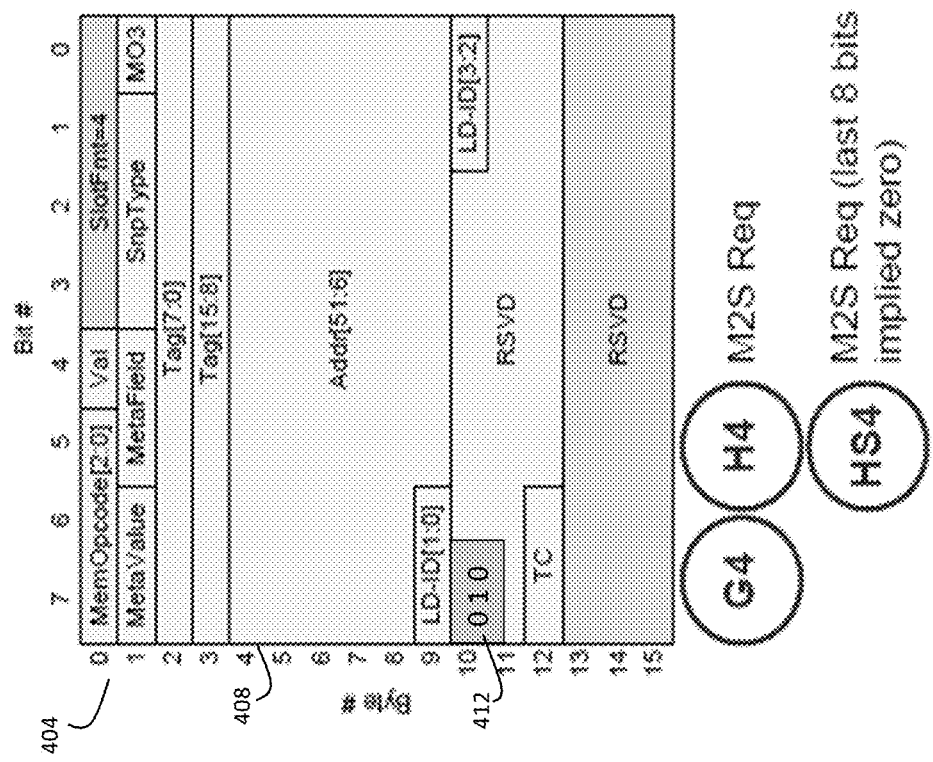
FIG. 4 shows example CXL read request header structures modified to include bit vectors defining the combined read requests according to some example embodiments of the present disclosure.
Figure 4:
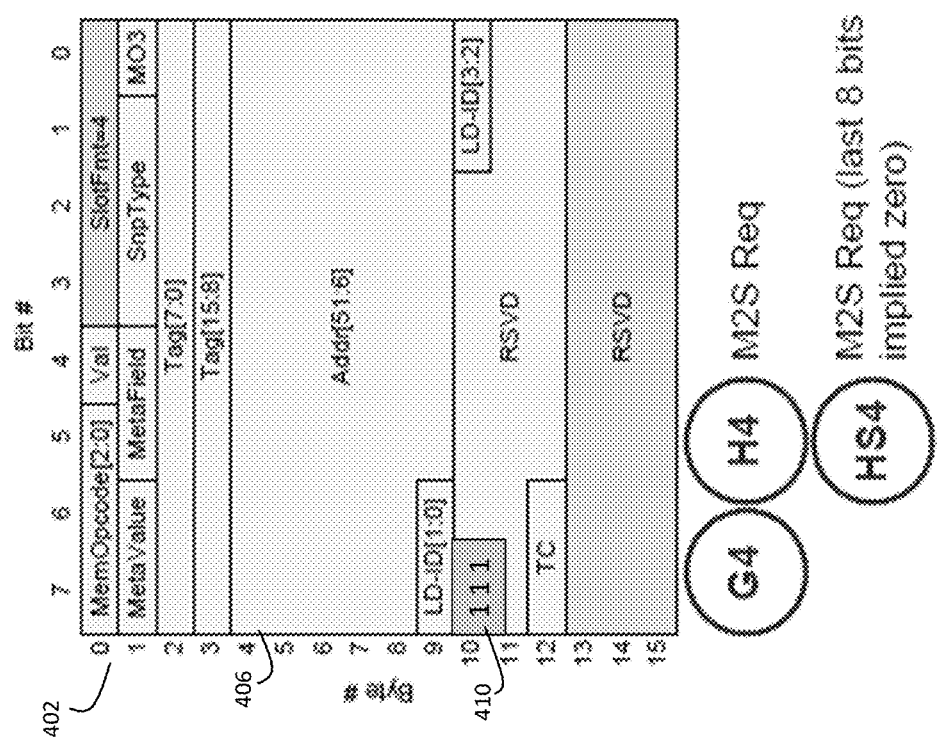

FIG. 4 illustrates two example read requests (also referred to as read request headers) 402 and 404, according to some embodiments. The read request 402 includes a base address 406 and a bit vector 408. The read request 404 includes a base address 410 and bit vector 412. The bit vectors can be considered to have sequential address encoding and may be part of CXL message header formats G2, H4, HS4, G14, H14, and HS14 specified in the CXL specification. The length of the bit vector would determine the number of sequential read requests that can be combined as part of a single read or write message.

For example—if the bit vector is 3 bits, then the number of reads that can go as part of the combined read header would be 4 (=1+3) and for the combined write header, would be 3 (=3). In embodiments, using the header formats specified in the CXL specification, such as header formats 402, 404, 502 and 504 (see FIG. 5), the sequential address encoding bit vector length can be based on the number of reserved bits that can be used for bit vector encoding from CXL message header.

Read header 402 is an example 256 B flit read header and encodes four incoming read requests. The respective read requests have addresses 0x4000, 0x4040, 0x4080, and 0x40C0. The base address 406 is 0x4000. Each bit in the bit vector 419 represents a 64 B address block. Since each address is the starting address of the 64 B data block, the address range within which read requests can be combined (referred to as combinable address range) extends to 64×4 bytes from the base address. Alternatively, it may be considered that the combinable address range extends 64×3 bytes (or 3 predetermined fixed block sizes of 64 bytes) starting at one predetermined fixed size block after the base address.

Since the base address 0x4000 is included in its own field in the header, the bit vector encodes the other requests' addresses 0x4040, 0x4080, and 0x40C0. The addresses 0x4040, 0x4080, and 0x40C0 represent consecutive 64 B blocks starting one block of predetermined fixed block size after the base address 0x4000. Therefore, the bit vector provides a sequential address encoding of 1 b' 111.

Read header 404 is an example of a 256 B flit read header and encodes one incoming read request in addition to the base read request. The respective read requests have addresses 0x4000 and 0x4080. The base address 408 (address specified to address in the base read request) is 0x4000. Each bit in the 3-bit bit vector 412 represents a 64 B address block. Since each address is the starting address of the 64 B data block, the address range within which read requests can be combined (referred to as combinable address range) extends to 64×4 bytes from the base address.

Since the base address 0x4000 is included in its own field in the header, the bit vector encodes the other request's address 0x4080. The addresses 0x4000 and 0x4080 represent non-consecutive 64 B blocks of a 64 B×4 memory area starting at the base address 0x4000. Therefore, the bit vector provides a sequential address encoding of 1 b' 010.

In some example embodiments, the G4, H4, and HS4 headers that are specified for downlink read requests in CXL specifications may correspond to the header formats 402 and 404.

Figure 5:
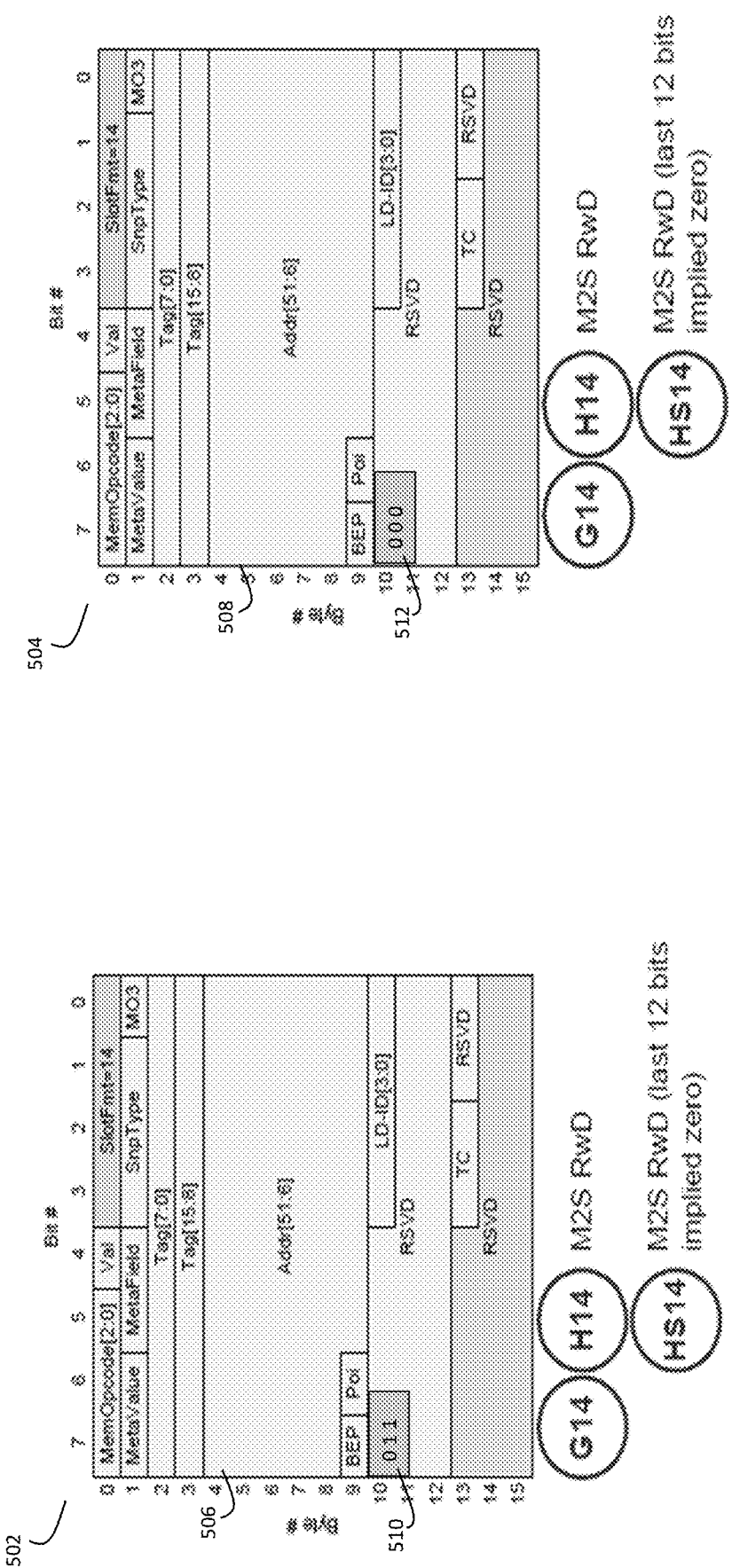
FIG. 5 shows example CXL write request header structures modified to include bit vectors according to some example embodiments of the present disclosure.

FIG. 5 shows two example write requests (also referred to as write request headers) 502 and 504, according to an embodiment. Write request 502 includes a base address 506 and a bit vector 510 and read request 504 has a base address 508 and bit vector 512.

Write header 502 is an example 256 B flit write header and can encode up to three incoming read requests. The write request is to write at a base address of 0x4000. The respective read requests have addresses 0x4080 and 0x40C0. The base address 506 is 0x4000. Each bit in the bit vector 508 represents a 64 B address block. Since each address is the starting address of the 64 B data block, the address range within which read requests can be combined (referred to as combinable address range) extends to 64×3 bytes from the end of the block that starts at the base address.

Since the base address 0x4000 is included in its own field in the header, the bit vector encodes the read requests' addresses 0x4080 and 0x40C0. The addresses 0x4080 and 0x40C0 represent non-consecutive 64 B blocks starting at the base address 0x4000. Therefore, the bit vector provides a sequential address encoding of 1 b' 011.

Write header 504 is an example 256 B flit write header that can encode additional read requests. The header 504 does not encode any additional read requests. The base address 508 is 0x4000. Each bit in the 3-bit bit vector 512 represents a 64 B address block. Since each address is the starting address of the 64 B data block, the address range within which write requests can be combined (referred to as combinable address range) extends to 64×3 bytes from the end of the block that starts at the base address.

Since the base address 0x4000 is included in its own field in the header, the bit vector encodes the other requests in the combinable address range. Therefore, the bit vector provides a sequential address encoding of 1 b' 000.

In some example embodiments, the G14, H14, and HS14 headers that are specified for downlink write requests in CXL specifications may correspond to the header formats 502 and 504.

Figure 6:
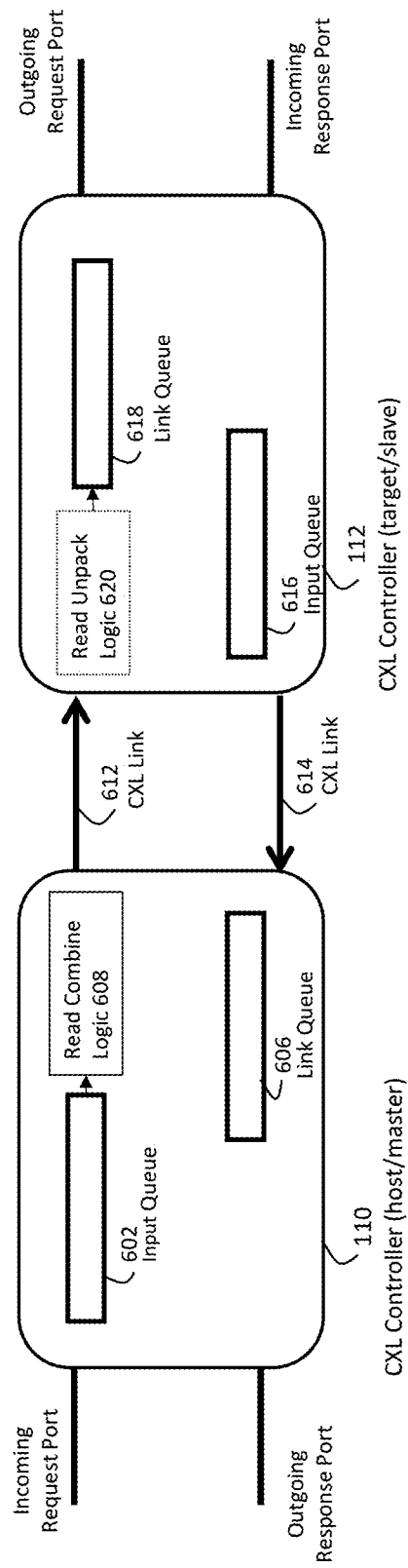
FIG. 6 is a flowchart of a process at a host device to improve bandwidth utilization in the system shown in FIG. 1 by taking advantage of spatial locality to combine read requests, in accordance with some example embodiments.

FIG. 6 schematically illustrates some components of an interface host device and an interface target device associated with a communication link such as communication interface 106 in FIG. 1. In accordance with some embodiments, the interface host device and the interface target device are CXL protocol controllers such that the interface host device may correspond to the CXL initiator controller (host) 110, and the interface target device may correspond to the CXL target controller (target) 112.

The interface host device and the interface target device each is configured with a respective input buffer (e.g., input queue) in which to queue the messages to be transmitted over communication interface 106 and a link buffer in which to temporarily buffer messages received over the communication interface 106. More specifically, input buffer 602 of the CXL initiator (host) 110 temporarily buffers read request messages and write request messages that are to be transmitted downstream from the CXL initiator 110 to the CXL target 112 over a downstream unidirectional link 612. Input buffer 616 of the CXL target 112 temporarily buffers read response messages and write response messages to be transmitted upstream from the CXL target 112 to the CXL initiator 110 over the upstream unidirectional link 614. Read response messages may be associated with data being returned, while there is no data being returned with write response messages. In some embodiments, a read request message is represented by a read header in a single slot of the flit that is transmitted on the link 612. A read response includes a header in a flit on the link 614 and a plurality (e.g., 4) of slots of data in the same flit.

The CXL initiator 110 additionally includes a read combine logic 608. The read combine logic 608 operates, as described above in relation to FIG. 7 for example, to combine one or more read requests with a read or write request that is to be sent out on the CXL link 612.

For example, when a next message in the input buffer 602 to be transmitted on link 612 is a read request, the read combine logic 608 operates to find one or more other read requests in the input buffer 602 that are spatially local to the read request to be sent. If one or more spatially local read requests are found in the buffer 602, the read combine logic 608 encodes those read requests in the header of the read request to be transmitted and does not separately transmit those read requests. In that manner, the read combine logic 608 reduces the number of slots occupied in a flit by one or more slots that would otherwise have been occupied by additional read requests that are spatially local to a read request to be sent.

The spatially local read requests are encoded in a bit vector in the header of the read request to be transmitted. The length of bit vector can be determined based on the available space in a particular header format. In the CXL header formats shown in FIG. 4 and FIG. 5, the bit vector is encoded in the reserved bits of the header. In one embodiment, as shown, the bit vector can be of length 3 bits. Each bit in the bit vector represents the address of a respective read request.

The position of a bit indicates by how much the corresponding address is offset from the base address. The base address is already encoded in the header and therefore is not separately represented in the bit vector. The first bit in the bit vector represents a first address that is offset 1 block size from the base address, the second bit represents a second address that is offset 2 blocks from the base address, and the third bit represents a third address that is offset 3 blocks from the base address. The block size may be different in different embodiments.

An example block size is 64 B. The value of the bit (i.e., 1 or 0) in a bit position in the bit vector represents whether a read request with the corresponding address is combined in the header. A value of 1 (i.e., the bit being set) indicates that the corresponding read request is combined in the current header and a value of 0 (i.e., the bit is not set) indicates that the corresponding read request is not combined in the current header.

The read requests that can be combined with the first request must have a certain spatial locality to the first request. That is, given that the base address is the address specified for the first request, any additional read request that is to be combined with the first request must have an address that is within a certain distance from the base address. This distance is referred to herein as the extent of the spatial locality or as the combinable address range. When the base address is known and the length of the bit vector is known, the combinable range of addresses can be calculated. Each bit position represents a block of a predetermined fixed block size (e.g., 64 B). When the first request is a read request, then the first block of the predetermined fixed size starting at the base address (i.e., the address accessed by the first request) is the memory region accessed by the first request.

Each of the second read requests that are combined with the first request (i.e., each read request that is entirely encoded by the respective bit in the bit vector in the first request's header) is defined to access a memory region that starts at the address defined by the bit position and extending to the predetermined fixed size. Thus, the combinable address range for a first request that is a read request and that has a bit vector of n bits starts at the base address and extends to the end of n+1 blocks of the predetermined fixed size.

For a first request that is a write request and that has a bit vector of n bits, the combinable address range for read requests starts after 1 predetermined fixed sized block, and then extends n predetermined fixed sized blocks.

In an operational scenario where the host controller 110 transmits a flit with a first read request that combines two additional read requests in the first request, in response, three read responses will be received with each read response comprising the requested data and optionally its own response header. The received read responses are stored in link queue 606 before being processed by other components of the host.

When a first request with one or more combined additional read requests is received at the CXL target 112 over the link 612, a read unpack logic 620 unpacks the combined additional read requests that can be stored in the link buffer 618 to be sent to the backend memory and/or to be processed by other components of the target. For example, when the first request is for the base address 0x4000 and encodes two additional read requests for addresses 0x4080 and 0xC0, then three read requests—the first request to address 0x4000, a second read request to address 0x4080 and a third read request to address 0x40C0—are input to buffer 618.

The CXL initiator 110 and CXL target 112 may be such that the target device is a CXL Type 3 device in which all requests for memory are initiated by the host and the target does not initiate requests for memory. Since the CXL target 112 does not initiate read requests it may be assumed that the CXL target 112 does not implement any of the request combining described above with regard to the CXL initiator 110. The buffer 616 on the CXL target 112 includes responses to requests received from the host controller.

Figure 7:
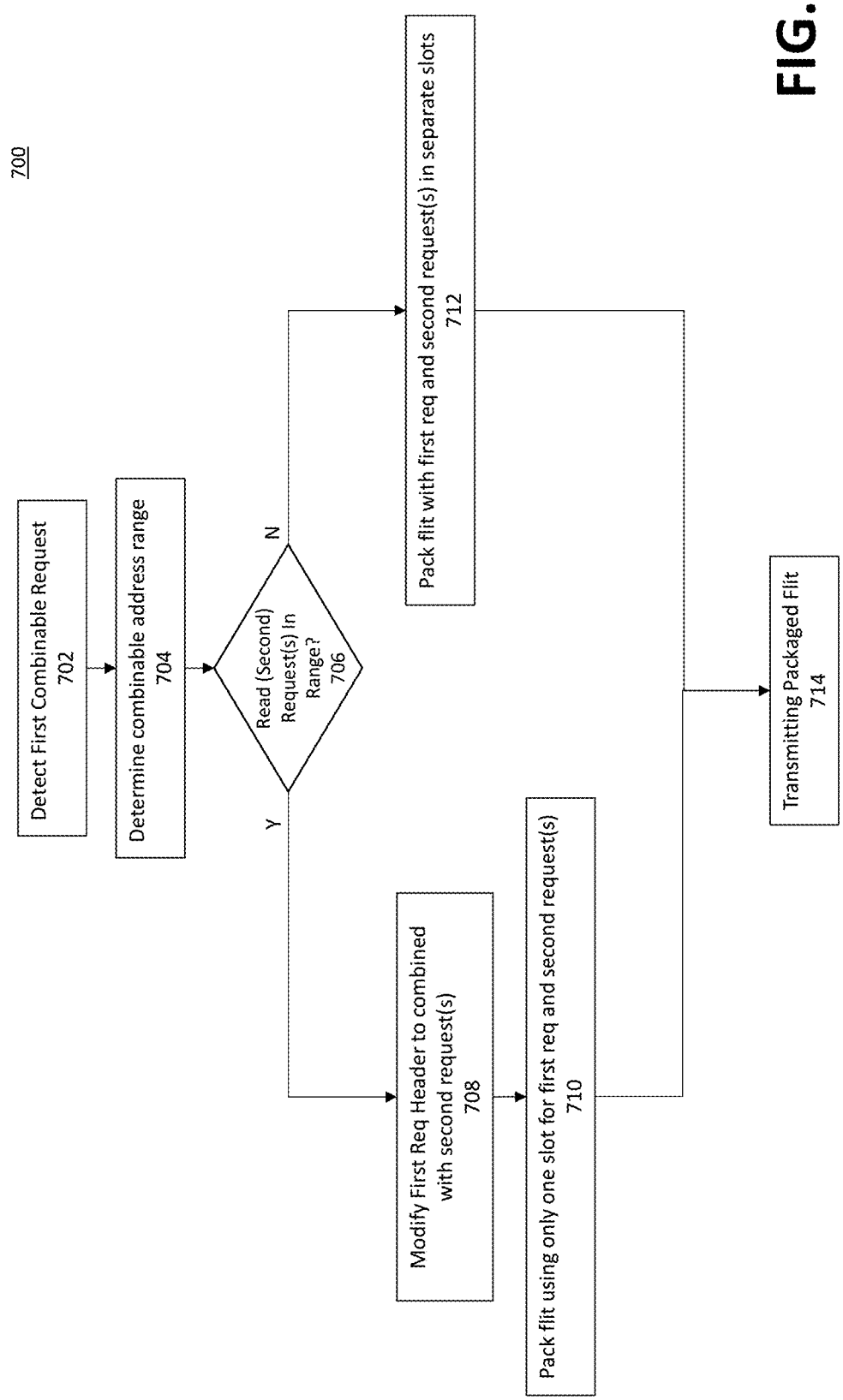
FIG. 7 is a flowchart of a process at a target device to improve bandwidth utilization in the system shown in FIG. 1 by taking advantage of spatial locality to combine read requests, in accordance with some example embodiments.

FIG. 7 is a flowchart of an exemplary process 700 for improving bandwidth utilization in the system 100 shown in FIG. 1 by combining read requests, in accordance with the embodiments.

The process 700 commences when the CXL initiator 110 is ready to transmit a message. At operation 702, the CXL initiator 110 detects, for example, in buffer 602, a first memory access request to be transmitted. In one embodiment, the first memory access request is a read request.

At operation 704, the combinable address range is determined. At operation 706, it is determined whether one or more other requests exists such that each is a read request that has an access address within the combinable address range. For example, the one or more requests may be detected in the input buffer 602. The requests that are combined, at least in some embodiments, differ only in the accessed address.

When no such other request is detected at operation 706, the processing proceeds to packing the outgoing flit with the first request and other requests such that each request occupies one slot in the flit at operation 714.

Alternatively, when the other requests are found at operation 706, then at operation 708, the first request is modified to additionally represent each of the other requests. In some embodiments, the first request may consist of only a header. The header of the first request is modified to include a bit vector in which each bit position is used to encode the presence or absence of one of the other requests that is within the combinable address range of the first request. At operation 710, a single slot of the outgoing flit is packed with the first request having the bit vector that encodes the one or more other requests.

At operation 714, occurring after either operation 710 or after operation 712, the flit is transmitted on the CXL downlink 612. For example, depending on the size of the flit and/or the number of requests of a particular type that can be accommodated in a single flit, the flit can be packed to the extent possible. The transmitted flit may or may not include at least some empty slots. When the flit includes 15 slots available for requests from the host to the target, each read request requires 1 slot (e.g., a read request can be entirely contained within a read request header, see FIG. 4), and each write request requires 4 slots for the associated data, the flit can be packed to include some combination of read requests and write requests. The packaging may be performed in accordance with rules specified for a standard protocol for the communication interface 106, such as, for example, the CXL protocol. Example rules for CXL include not allowing more than two consecutive read requests, etc.

Figure 8:
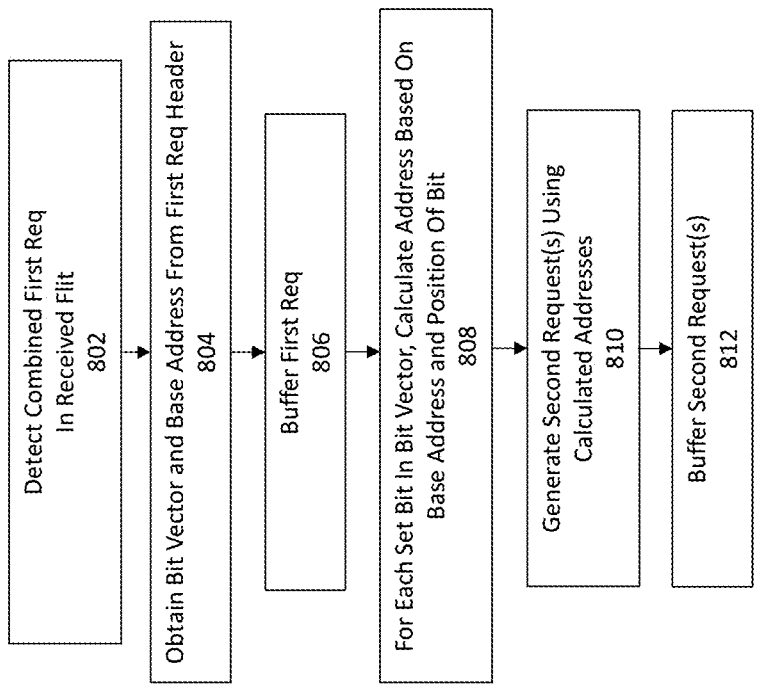
FIG. 8 illustrates a flowchart of an exemplary process performed by the CXL target at a CXL controller according to some example embodiments.

FIG. 8 illustrates a flowchart of an exemplary process 800 performed by the CXL target 112 at a CXL controller according to some example embodiments. The process 800 provides for the target device to receive combined read requests formed and transmitted by CXL host devices according to some example embodiments as described in relation to FIG. 7 above.

The process 800 begins when a flit is received at a CXL target device such as the memory device 104. At operation 802, the CXL target detects a combined read request in the received flit. In one embodiment, the detection is based on the format of the header of the request. Request headers include a bit vector (e.g., bit vectors 408, 412, 508, 512) as shown in FIG. 4 or FIG. 5. Requests that combine read requests are indicated by another header field that can be detected by the controller. At operation 804, the base address and the bit vector are obtained from the first request. At operation 806, the first request is buffered in the link buffer 618.

At operations 808 and 810, respective read requests are generated for each of the bits that are set in the bit vector. For example, at operation 808 an access address may be calculated for each of the bits that are set in the bit vector. The calculated address is based on the base address of the first request and is offset from the base address by a predetermined fixed block size x (i+1) when i represents the bit position in the range of 1 to n where n is the number of bits in the bit vector. At operation 810, respective read requests are generated for the access addresses generated in operation 808. For example, for each access address generated at operation 808, a read request header (see FIG. 4, for example) is generated and the access address is written in the base address field. Other fields of the read request may also be filled.

At operation 812, the generated read requests are input to the buffer 618.

At operation 814, the flit is transmitted on the CXL uplink 614. For example, depending on the size of the flit and/or the number of responses of a particular type that can be accommodated in a single flit, the flit can be packed to the extent possible. The transmitted flit may or may not include at least some empty slots. When the flit includes 15 slots available for requests from the target to the host, each write response requires 1 slot (e.g., a write response can be entirely contained within a write response header), and each read response may requires 4 slots for the associated data, the flit can be packed to include some combination of read responses and write responses. The packaging may be performed in accordance with rules specified for a standard protocol for the communication interface 106, such as, for example, the CXL protocol.

The above-described processes 700 and 800 provide for read request to be combined before transmission where possible and unpacked at the receiving end to improve the utilization of slots in a flit for data over a communication link. Processes 700 and 800 are described above with respect to the host-target configuration of CXL controllers shown in FIG. 6, where all the requests were initiated at the host 102 and the memory device 104 merely responded to the requests.

In such embodiments, the request combine logic 608 may be implemented only on the host-side and the read unpack logic 620 may be implemented only on the target-side. In some other embodiments, when the device-side too can initiate requests, then the device may also implement request combine logic and read unpack logic that may operate in a similar manner to the corresponding components on the host-side to package flits heading in the direction from the device to host.

Example embodiments were described above primarily in relation to the CXL 2.0 and/or 3.0 specifications. Moreover, some of the described embodiments described a CXL Type 3 memory device communicating with a host. It will, however, be understood that embodiments are not limited to the CXL or the CXL versions that are specifically mentioned here. Moreover, example embodiments may be applicable to devices other than memory devices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

For example, the various illustrative blocks and components described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A device comprising:
    an interface to a bidirectional communication link;
    a buffer configured to store messages to be transmitted on the bidirectional communication link; and
    a protocol controller configured to perform operations comprising:
        detecting a first memory request in the buffer, wherein the first memory request is for accessing a first memory address;
        determining a combinable range of memory addresses;
        detecting at least one second memory request in the buffer, wherein each second memory request of the at least one second memory request is a read request for data at a respectively different second address that is in the combinable range of addresses;
        encoding each said respectively different second address in a header of the first memory request; and
        transmitting the first memory request with the encoded header.

2. The device according to claim 1, wherein the encoding each said respectively different second address in the header of the first memory request comprises encoding each said respectively different second address in a bit vector in the header.

3. The device according to claim 2, wherein the determining a combinable range of memory addresses comprises calculating the combinable range of memory addresses based on the first memory address, a size of the bit vector in the header and a predetermined fixed block size.

4. The device according to claim 3, wherein the combinable range of memory addresses begins at a predetermined size from the first address and extends to b predetermined fixed block sizes, wherein b is the number of bits in the bit vector.

5. The device according to claim 1, wherein the first memory request is a read request.

6. The device according to claim 1, wherein the first memory request is a write request.

7. The device according to claim 1, wherein the transmitting the first memory request with the encoded header comprises packing one slot in a flit with the encoded header and transmitting the packed flit, wherein no other slots in the flit include a header for any of the at least one second memory request.

8. The device according to claim 1, wherein the operations further comprise:
receiving over the bidirectional communications link, in response to a read request in the at least one second memory request, a read response message including the data at the respectively different second address.

9. The device according to claim 8, wherein the read response occupies a plurality of slots in a received flit.

10. The device according to claim 1, wherein protocol controller is configured to transmit data on, and receive data from, the bidirectional communication link in accordance with the CXL protocol.

11. A device comprising:
an interface to a bidirectional communication link; and
a protocol controller configured to perform operations comprising:
obtaining a first memory request from a flit received from the interface, wherein the first memory request is for accessing a first memory address indicated in the first memory request;
obtaining a bit vector encoded in the first memory request; and
forming one or more second memory requests based on the bit vector, each memory request of the one or more second memory requests being for reading data at a respectively different memory address determined in accordance with the first memory address and a respective bit position in the bit vector.

12. The device according to claim 11, further comprising a buffer configured to store messages received on the bidirectional communication link, wherein the protocol controller is further configured to store the first memory request and each of the one or more second memory requests in the buffer.

13. The device according to claim 11, wherein the first memory request occupies one slot of the plurality of slots in the flit.

14. The device according to claim 11, wherein the forming one or more second memory requests based on the bit vector comprises generating a respective one of the second memory requests for each bit that is set in the bit vector.

15. The device according to claim 14, wherein the generating a respective one of the second memory requests for each bit set in the bit vector comprises calculating a respective memory address that is offset from the first memory address in accordance with a position of said each bit that is set in the bit vector.

16. The device according to claim 11, wherein the first memory request is a read request.

17. The device according to claim 11, wherein the first memory request is a write request.

18. The device according to claim 11, wherein the operations further comprise: transmitting over the bidirectional communications link, in response to a read request in the one or more second memory requests, a read response message including data at the respectively different memory address.

19. The device according to claim 11, wherein protocol controller is configured to transmit data on, and receive data from, the bidirectional communication link in accordance with the CXL protocol.

20. A method comprising:
encoding, in a computing system, a header field of a first memory request to include memory addresses for the first memory access request and respective second memory requests of one or more second memory requests;
packing the first memory access request in one slot of a message transmission data structure having a plurality of slots;
transmitting the packed message transmission data structure; and
receiving, in response to the transmitted packed message transmission data structure, a second message transmission data structure having a plurality of read response messages, wherein, for each of the plurality of read response messages, a header and a plurality of data blocks each are packed in a respectively different slot in the second message transmission data structure.

* * * * *